United States Patent [19]

Bianco

[11] 4,007,523
[45] Feb. 15, 1977

[54] B-X CABLE PLIERS

[76] Inventor: Archangel J. Bianco, P.O. Box 93, Shores-Road, Brookside, N.J. 07926

[22] Filed: June 9, 1975

[21] Appl. No.: 584,812

[52] U.S. Cl. .............................. 30/90.2; 30/91.1; 30/91.2; 30/258

[51] Int. Cl.² .................. B21F 13/00; B26B 27/00

[58] Field of Search ............... 30/90.8, 90.1, 90.2, 30/90.4, 90.6, 90.7, 91.1, 91.2, 92, 92.5, 229, 258

[56] References Cited

UNITED STATES PATENTS

| 170,658 | 12/1875 | Berridge | 30/258 |
| 191,416 | 5/1877 | Fetter | 30/258 X |
| 325,291 | 9/1885 | Warner | 30/258 |
| 567,722 | 9/1896 | Pike | 30/258 X |
| 596,546 | 1/1898 | Runyan | 30/258 |
| 1,368,244 | 2/1921 | Desrochers | 30/258 X |
| 1,812,350 | 6/1931 | Lingwood | 30/258 X |
| 2,153,510 | 4/1939 | Bowen | 30/90.2 |
| 2,357,197 | 8/1944 | Hood | 30/258 |
| 2,529,171 | 11/1950 | Menser | 30/258 |
| 3,025,599 | 3/1962 | Sauers et al. | 30/258 X |

FOREIGN PATENTS OR APPLICATIONS

| 225,598 | 1/1959 | Australia | 30/258 |
| 656,739 | 1/1929 | France | 30/258 |
| 807,075 | 10/1936 | France | 30/258 |
| 1,007,663 | 5/1957 | Germany | 30/258 |

Primary Examiner—Al Lawrence Smith
Assistant Examiner—J. T. Zatarga
Attorney, Agent, or Firm—Lewis H. Eslinger

[57] ABSTRACT

A device for cutting B-X cable has a pair of pivotally interconnected operating members, each of which defines cutting jaws, with one of the operating members having a bifurcated end portion that defines a pair of spaced cutting jaws receiving therebetween the cutting jaw of the other operating member. The lower surface of the bifurcated jaws are notched transversely of their length in a configuration which is adapted to receive one of the convolutions or corrugations of the B-X cable when the single cutting jaw of the other operating member is inserted longitudinally into the end of the B-X cable. This single cutting jaw has a tapered free end portion which enables it to be inserted beneath the metal wrapping of the B-X cable so that the cable can be cut along its length by movement of the handle portions of the operating members towards each other. The notched portions of the bifurcated cutting jaws provide a positive gripping engagement with the curved B-X cable.

6 Claims, 4 Drawing Figures

B-X CABLE PLIERS

The present invention relates to cutting devices and, more particularly, to a device which is adapted to cut the metal wrapping on conventional B-X cable.

B-X cable as used in the construction industry consists of a plurality of metal wires contained in a metal wrapping or sheath. This sheath typically consists of a fairly thick strip of corrugated metal which is wrapped in a helical manner about the plurality of conductive wires. In using B-X cable to make electrical connections within a building or the like, the electrician must cut the cable transversely of its length to form desired lengths of the cable. Many devices have been proposed for transversely cutting B-X cable and various types of pliers or the like are known in the art. However, in addition to cutting the B-X cable transversely, it is also necessary for the electrician to cut the cable along its length at its end in order to unwrap the first few turns of the metal sheath and to expose the electrically conductive wires for connection to an electrical fixture. This is an extremely difficult operation to perform without disturbing or destroying the conductive wires or even injuring the electrician's hands. Heretofore, tin metal shears or the like have been used to make such cuts but such shears have not been found to be satisfactory in performing a clean and efficient cut along the length of the B-X cable at its ends.

Accordingly, it is an object of the present invention to provide a cutting device which is adapted to cut metal wrapped B-X cable transversely of its length and also along its length at a free end of the cable.

Another object of the present invention is to provide a cutting device which is relatively simple in construction and inexpensive in manufacture.

Yet another object of the present invention is to provide a B-X cable cutting device which is relatively simple to use, and reliable in operation.

In accordance with one aspect of the present invention, a device for cutting B-X cable of the type having a convoluted metal wrapping thereon is provided which includes first and second pivotally interconnected operating members each of which has first and second end portions that respectively define handle and cutting portions for the device. The cutting portion of the first operating member is bifurcated to define two parallely extending spaced cutting or anvil jaws. These cutting jaws each have a lower cutting surface which is relatively flat in cross section and which is slightly convex along the length of the jaw from a position adjacent the pivotal connection between the operating members to a free end of the jaw that is spaced from that pivotal connection. The lower surface of these cutting jaws each has an arcuately shaped downwardly opening notch formed therein for receiving at least one generally complementary convolution on B-X cable.

The cutting portion of the second operating member defines a single cutting jaw and is located between the bifurcated jaws of the first operating member for pivotal movement with respect thereto. This cutting jaw is relatively thin and has an upper cutting surface for cooperating with the lower surfaces of the first operating member to cut the B-X cable, with the lower surfaces of the first cutting member thus operating as an anvil against which the metal sheath of the B-X cable is cut. As a result, the cutting jaw of the second operating member can be inserted longitudinally into the end of the B-X cable with the notch in the cutting jaws of the first operating member firmly engaging a convolution of the B-X cable so that pivotal movement of the handle members towards each other will move the single cutting jaw of the second operating member between the cutting jaws of the first operating member to cut the B-X cable, with danger of the tool slipping to one side or the other of the cable as the cut is being made.

The above, and other objects, features and advantages of the present invention will be apparent in the following detailed description of an illustrative embodiment thereof, which is to be read in connection with the accompanying drawings, wherein.

Figure 1:
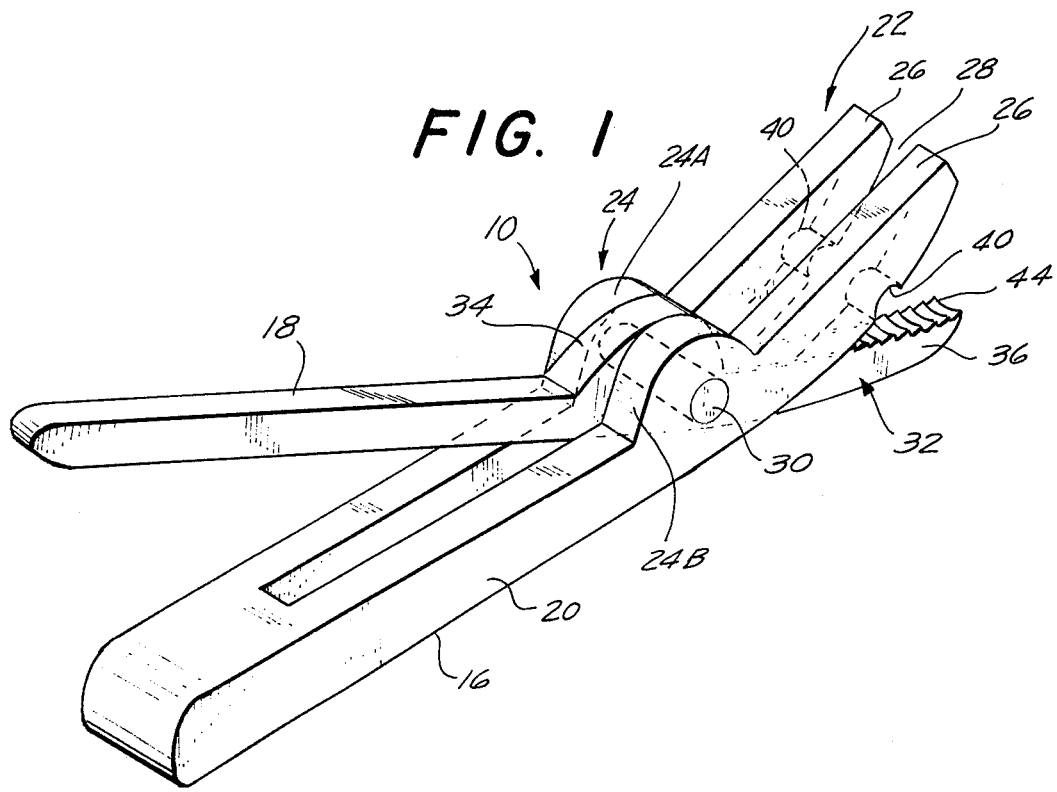
FIG. 1 is a perspective view of a B-X cable cutting tool constructed in accordance with the present invention.
Figure 2:
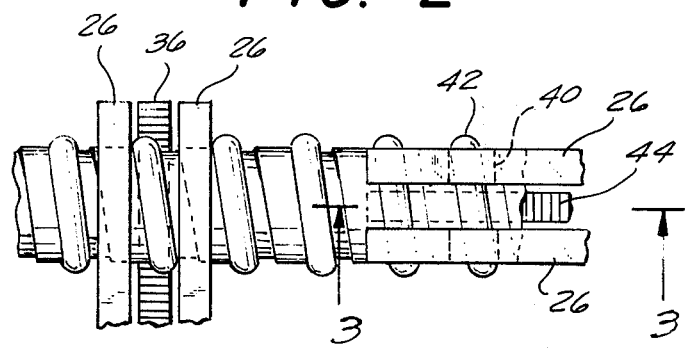
FIG. 2 is a plan view of a section of B-X cable showing the cable being cut transversely of its length and along its length at one end thereof.

Referring now to the drawing in detail and initially to FIG. 1 thereof a cutting device 10 according to the invention, is illustrated which is adapted to cut metal clad or sheathed B-X cable both transversely of its length and longitudinally of its length at an end portion 14 thereof (FIG. 2).

Cutting device 10 is of relatively simple construction and consists essentially of two operating members 16, 18 respectively. First operating member 16 includes a relatively wide handle portion 20 and a bifurcated end portion 22. An enlargement or boss 24 is formed between handle 20 and end portion 22, with the latter including a pair of spaced bifurcated jaw elements 26. An elongated slot 28 extends between jaws 26, enlargement 24 and a portion of handle 20, for reasons described hereinafter.

Second operating member 18 includes a forward portion 32 which is received in slot 28 between cutting jaws 26 and the spaced boss sections 24A and 24B. This extreme forward end portion of section 32 defines a cutting jaw member 36 which, as seen in FIG. 1, is located between the jaw members 26.

Member 18 also includes an enlargement or boss 34, which is generally complementary to boss 24, and is pivotally connected to member 16 at boss 24 by a pivot pin 30 or the like, in any convenient manner.

Jaw members 26 are each relatively square in cross section (FIG. 4) and have a flat lower surface 38. This surface 38 is generally convex along the length of the jaw members (see FIG. 3) and defines an anvil surface on its associated jaw member against which the cutting element or jaw 36 operates, as described hereinafter.

The anvil surfaces 38 of jaws 26 include substantially aligned recesses or notched portions 40 which are adapted to engage the convolutions or humps 42 on B-X cable 12. Thus these notches are formed with a configuration that is generally complementary to the standard convolution or corrugation on a B-X cable to insure that the cable is properly gripped by jaws 26 during the cutting operation in two spaced points along the curved surface of the B-X cable. As a result the cutting device does not slip during the cutting operation. On the other hand with previously proposed B-X cutting device, because of the curved configuration of the cable it is not possible to firmly grip the B-X cable and during the cutting operation the cutting device will slip to one side or the other, either damaging the cut or operator, or both.

Figure 3:
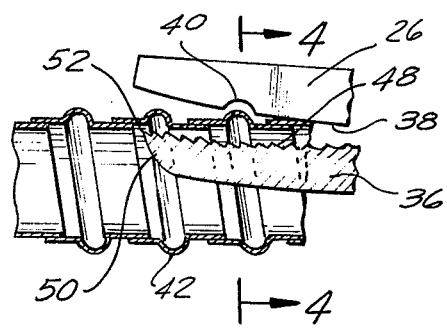
FIG. 3 is a sectional veiw taken along line 3—3 of FIG. 2.

Cutting jaw 36 of first operating member 18 has an upper cutting surface 44 which is generally concave along its length (FIGS. 1 and 3). The concavity of this cutting surface is generally complementary to the curvature along the length of the lower surfaces 38 of cutting jaws 26. In this manner a relatively sharp angle will be formed between the surface 44 and the anvil surfaces 38 during the cutting operation, to insure proper application of a shearing force to the metal on the B-X cable.

Figure 4:
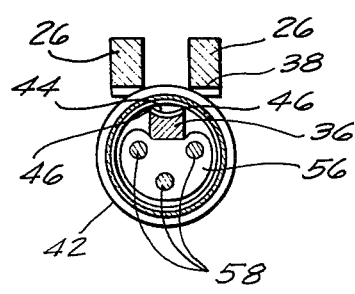
FIG. 4 is a sectional view taken along line 4—4 of FIG. 3.

The surface 44 of jaw 36 is also generally concave in cross section (see FIG. 4). This concavity defines two cutting edges 46 on opposite sides of jaw 36. These cutting edges will cooperate with the edges of the anvil surfaces 38 on jaws 26 to insure proper shearing action during the cutting operation. To further insure proper cutting and to aid in firmly gripping the sheet metal wrapping of the B-X cable during the cutting operation, surface 44 can be serrated in any convenient manner, as for example by the provision of saw-type teeth 48 (see FIG. 3).

In order to cut the B-X cable longitudinally of its length, the extreme free end portion 50 of cutting jaw 36 is inserted beneath the layer of metal wrapping of B-X cable 12. To facilitate such insertion jaw 36 is made relatively thin, and its free end portion 50 is tapered to a fairly sharp point 52. This construction facilitates the insertion of the jaw 36 into the position shown in FIGS. 3 and 4, below the metal wrapping of the B-X cable, but above the conventional paper wrapping 36 which surrounds the conductive wires 58 typically used in such cable. Thus the tool can be used without disturbing the conductive wires of the cable during the cutting operation. The tool can be used to equal advantage to cut the cable transversely of its length, as shown at the left in FIG. 2. In performing this cut the serrated teeth 48 on the cutting jaw 36 insure proper gripping engagement with the outer surface of the metal wrapping of the B-X cable. The sharp edges 46 formed by the concave surface 44 further insure proper gripping and cutting action against the anvil members 38.

Accordingly, it is seen that a relatively simple cutting device or tool is provided which is extremely useful in cutting B-X cable. The device is particularly adapted to cut the cable longitudinally of its length, due to the configuration of the bifurcated jaws 26, with the preformed notch 40 formed therein and with the concave and serrated jaw 36. In addition, the construction of the tool with the relatively broad handle portion 20 on the first or lower operating member 16 further facilitates operation since it is this handle portion which is engaged by the fingers of the hand during operation. The wide handle allows the two handle portions of the tool to be urged together with a firmer grip than conventional cutting tools using narrow handles which apply localized pressure to the fingers.

Although an illustrative embodiment of the present invention has been described herein with reference to the accompanying drawings, it is to be understood that the invention is not limited to that precise embodiment, and that various changes and modifications may be effected therein by one skilled in the art without departing from the scope or spirit of this invention.

What is claimed is:

1. A device for cutting B-X cable having a convoluted metal wrapping thereon, said device comprising first and second pivotally interconnected operating members each having first and second end portions with the first end portions thereof being located on one side of the pivotal connection between said members and defining handles; said second end portion of said first operating member being bifurcated to define two parallely extending spaced cutting jaws; said cutting jaws having laterally spaced free end portions remote from said pivotal connection and each having a lower cutting surface which is relatively flat in cross-section and which is slightly convex along the length of the jaw from adjacent the pivotal connection between said operating members to said free end of the jaw spaced from said pivotal connection; said lower surface of said cutting jaws each having an arcuately shaped downwardly opening notch formed therein dimensioned to receive and closely mate with at least one generally complementary convolution on the B-X cable; said second end portion of said second operating member defining a single cutting jaw and being located between the jaws of said first operating member for pivotal movement with respect thereto; said cutting jaw of the second operating member being relatively thin and having an upper cutting surface for cooperating with the lower surface of said first operating member to cut the B-X cable, said single cutting jaw of the second operating member being dimesioned to be inserted longitudinally into one end of a length of of B-X cable and its upper surface being serrated transversely of the length of the jaw to enable the jaw to firmly grip the metal wrapping during cutting; said upper surface of said single jaw, including the serrations thereon, being concave in shape transversely of its length thereby to define two spaced cutting edges respectively associated with the spaced cutting jaws on the first operating member; whereby when said single cutting jaw is inserted in the end of a length of B-X cable with the notch in said cutting jaws of the first operating member firmly engaging a convolution of the B-X cable, pivotal movement of said handle members toward each other will move the single cutting jaw of said second operating member between the cutting jaws of the first operating member to cut the B-X cable.

2. The device as defined in claim 1 wherein the single cutting jaw of said operating member has a free end portion; said free end portion being tapered to a point, to facilitate insertion of said single cutting jaw longitudinally into the B-X cable beneath the convoluted metal wrapping.

3. The device as defined in claim 2 wherein said upper surface of said single jaw is concave in shape along its length.

4. The device as defined in claim 3 wherein the concavity of said upper surface is generally complementary to curvature of the convex lower surfaces of said spaced cutting jaws on the first operating member.

5. The device as defined in claim 4 wherein the handle portion of said first operating member is below and wider than the handle portion of the second operating member.

6. The device as defined in claim 5 wherein said bifurcated jaws of the first operating member have enlargements formed therein between said handle portion and said convex surface portions thereof; said second operating member being pivotally connected to said second operating member at said enlargement whereby the enlargement reinforces the pivot connection.

* * * * *